(12) United States Patent
Swamidas et al.

(10) Patent No.: US 8,745,398 B2
(45) Date of Patent: Jun. 3, 2014

(54) PROVIDING SERVICES TO DEVICES USING A ZIGBEE NETWORK

(75) Inventors: Peter Jayaprathap Swamidas, Irving, TX (US); Soms Wongbar, Garland, TX (US); Vamshi K. Gillipalli, Irving, TX (US); John P. Valdez, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 666 days.

(21) Appl. No.: 12/652,935

(22) Filed: Jan. 6, 2010

(65) Prior Publication Data
US 2011/0167274 A1 Jul. 7, 2011

(51) Int. Cl.
*H04L 29/06* (2006.01)
(52) U.S. Cl.
CPC .................... *H04L 63/08* (2013.01)

USPC .......................................................... 713/176
(58) Field of Classification Search
USPC .......................................................... 713/176
See application file for complete search history.

(56) References Cited

U.S. PATENT DOCUMENTS

| 6,683,966 B1* | 1/2004 | Tian et al. ............ 382/100 |
| 2006/0259772 A1* | 11/2006 | Kruger et al. ........... 713/176 |
| 2007/0034691 A1* | 2/2007 | Davis et al. ............ 235/382 |
| 2008/0244271 A1* | 10/2008 | Yu ................... 713/176 |
| 2009/0210927 A1* | 8/2009 | Mokuya et al. .......... 726/3 |

\* cited by examiner

*Primary Examiner* — Benjamin Lanier

(57) ABSTRACT

A network device may receive two different sets of authentication information from a user device over a ZigBee network. The network device may authenticate the user device based on the received two different sets of authentication information and permit, in response to authenticating the user device, the user device to obtain a service by exchanging information between the network device and the user device over the ZigBee network.

20 Claims, 16 Drawing Sheets

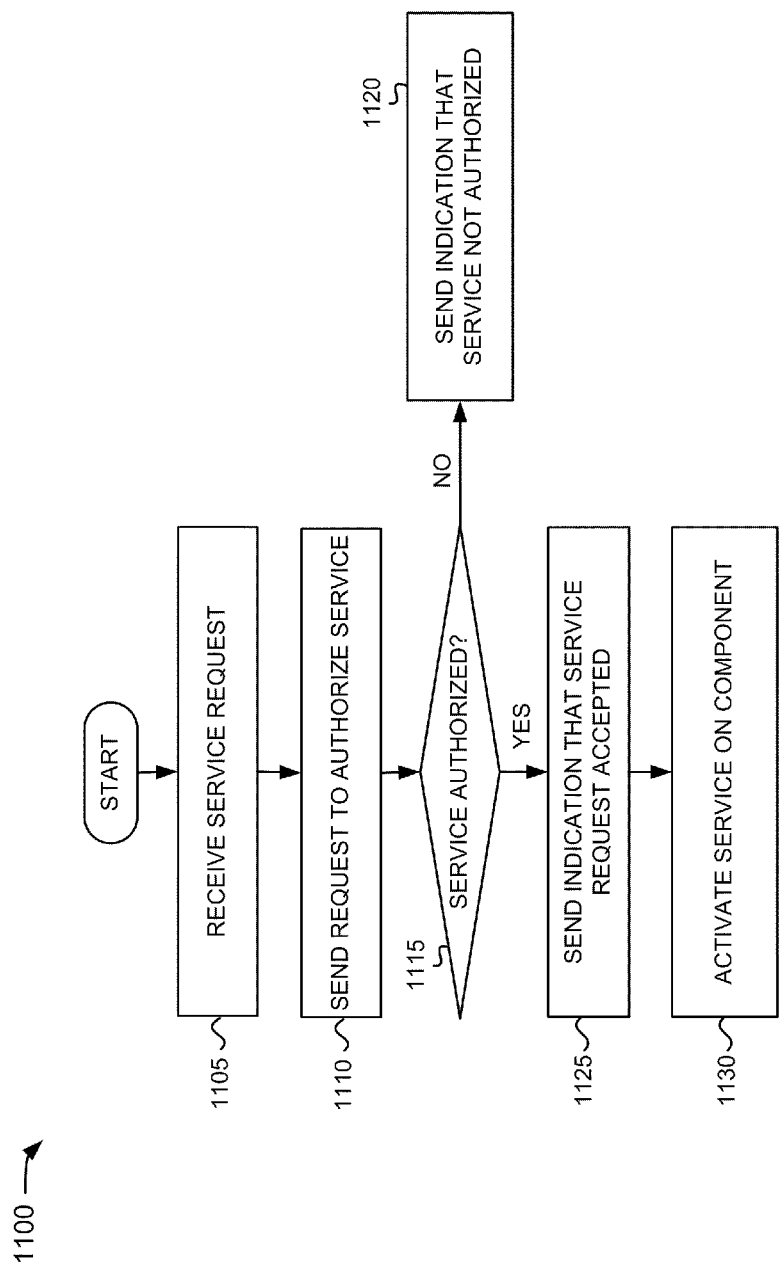

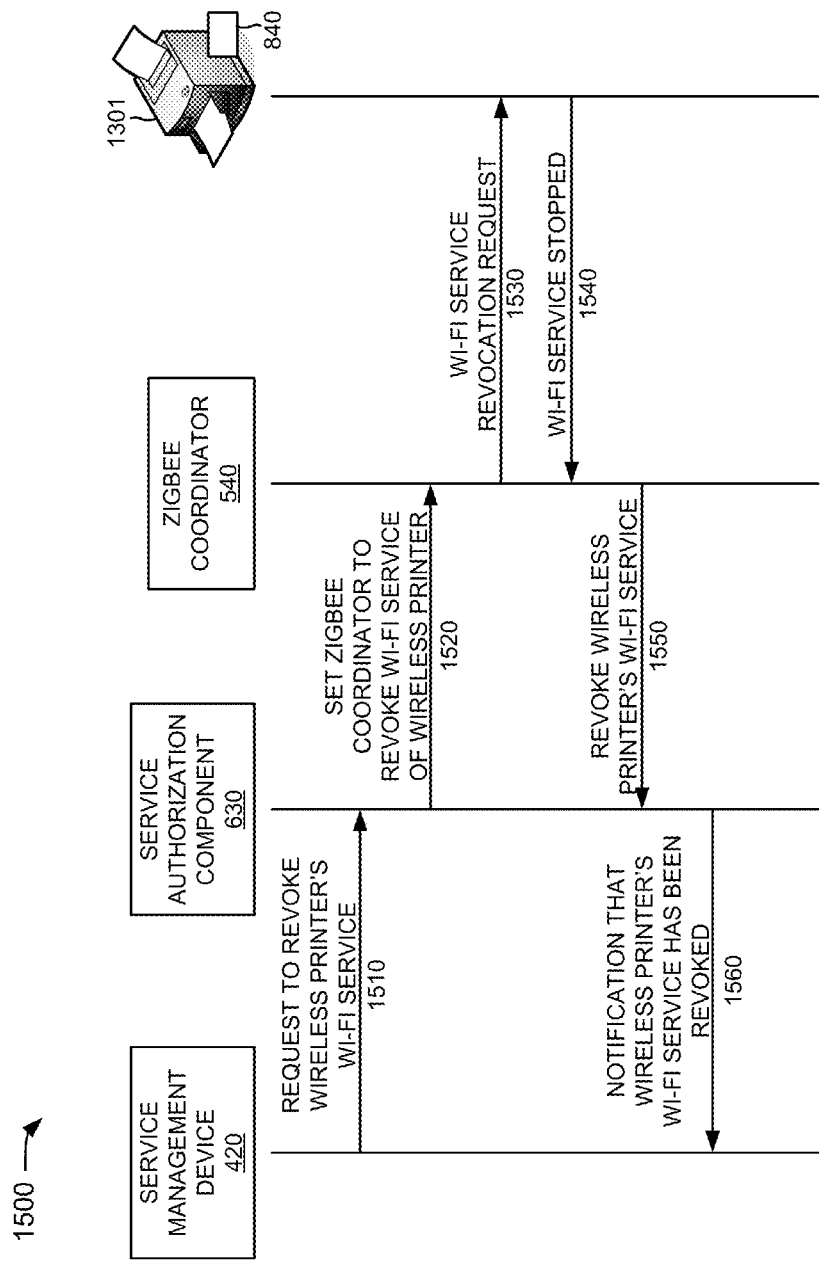

PROVIDING SERVICES TO DEVICES USING A ZIGBEE NETWORK

BACKGROUND INFORMATION

More and more of the devices in today's homes and businesses are connected via wireless networks. Connecting new devices to an existing wireless network can be challenging for individuals who are not technically savvy. In addition, connecting headless devices (i.e., devices that do not include a display) to an existing wireless network or providing services to headless devices can be challenging for even technically savvy individuals.

BRIEF DESCRIPTION OF THE DRAWINGS

FIG. 11 is a flow chart of an exemplary process for activating a service on a user device;

FIG. 15 is an example of the process described in FIG. 12.

DETAILED DESCRIPTION OF PREFERRED EMBODIMENTS

The following detailed description of embodiments refers to the accompanying drawings. The same reference numbers in different drawings may identify the same or similar elements. Also, the following detailed description does not limit the invention.

Systems and/or methods described herein may allow devices to automatically connect to a customer's network and automatically obtain one or more services. In one implementation, the devices may connect to and obtain services using the ZigBee standard.

Figure 1:
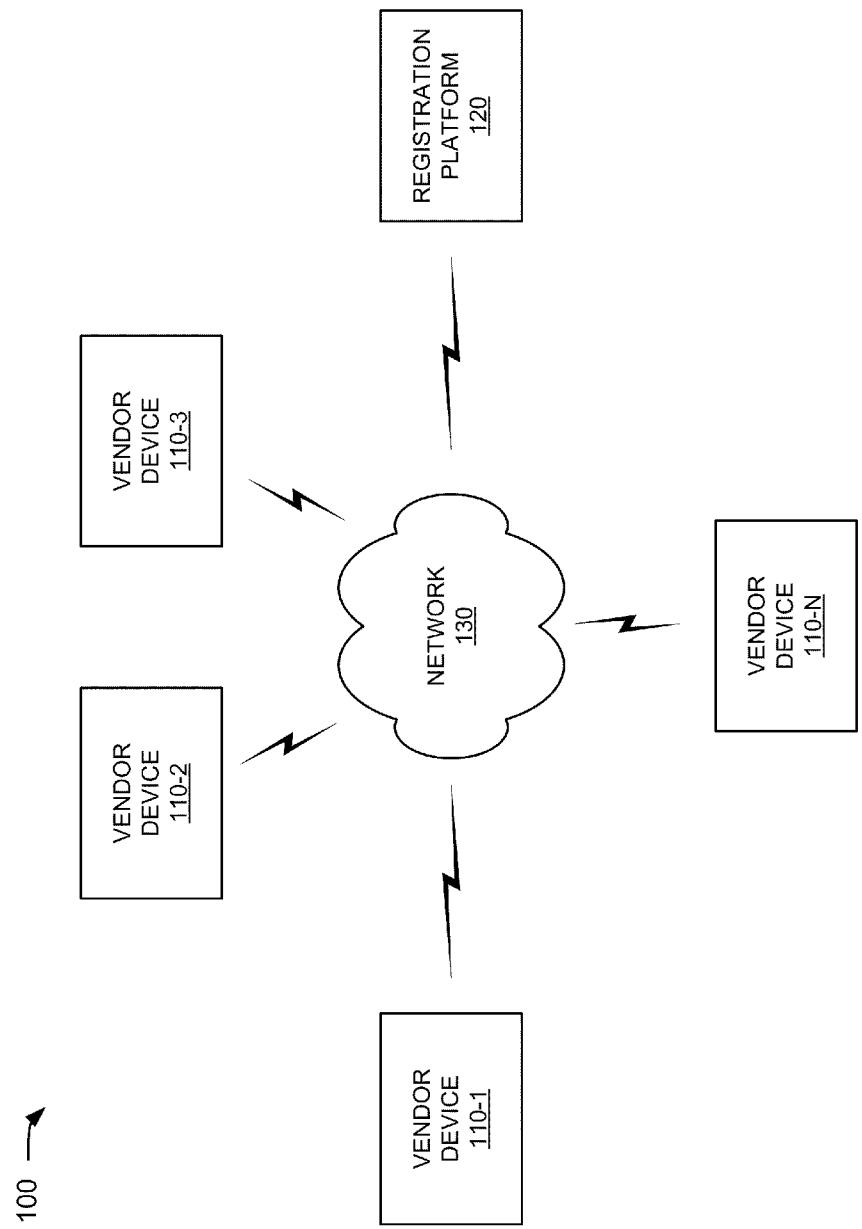
FIG. 1 is an exemplary environment in which systems and/or methods, described herein, may be implemented.

FIG. 1 is an exemplary environment 100 in which systems and/or methods, described herein, may be implemented. As illustrated, environment 100 may include a group of vendor devices 110-1 through 110-N (referred to collectively as "vendor devices 110" and in some instances, singularly, as "vendor device 110") that may connect to a registration platform 120 via a network 130.

Vendor devices 110 may include one or more devices that allow a vendor to register itself and/or one or more of the vendor's products. In one implementation, vendor devices 110 may include desktop computers, laptop computers, personal digital assistants (PDAs), cellular telephones, and/or other types of computational or communication devices. By registering itself and its product(s), a vendor may sell the product(s) to customers who may, in turn, easily integrate the products into the customer's home (or business) network and provide services to the products. Vendor devices 110 may connect to network 130 via wired and/or wireless connections.

Registration platform 120 may include one or more devices that may receive vendor and/or product registration requests from vendor devices 110 and may register vendors and/or products based on the registration requests. For example, registration platform 120 may include one or more servers, mainframe computers, desktop computers, laptop computers, personal digital assistants (PDAs), one or more cellular telephones, and/or other types of computational or communication devices. In one implementation, registration platform 120 may provide one or more graphical user interfaces (e.g., web pages) to a user to allow the user to register a vendor and/or a product. Registration platform 120 may connect to network 130 via wired and/or wireless connections.

Network 130 may include one or more networks of any type, including a Public Land Mobile Network (PLMN), a Public Switched Telephone Network (PSTN), a Local Area Network (LAN), a Metropolitan Area Network (MAN), a Wide Area Network (WAN), a private network, the Internet, an intranet, and/or another type of network.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform the tasks described as being performed by one or more other components of environment 100.

Figure 2:
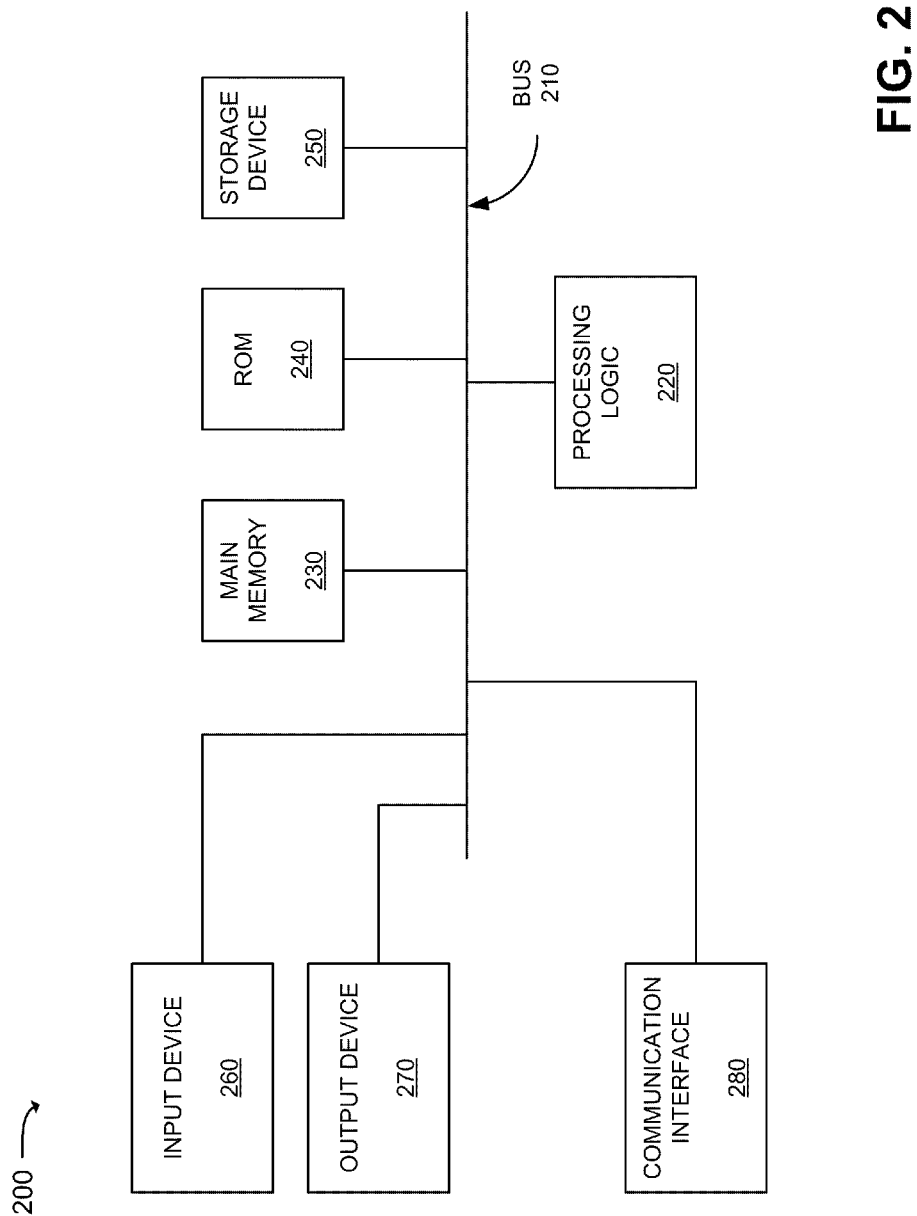
FIG. 2 is a block diagram of exemplary components of a device of FIG. 1.

FIG. 2 is a block diagram of exemplary components of a device 200 that may correspond to a vendor device 110 or registration platform 120. As illustrated, device 200 may include a bus 210, processing logic 220, a main memory 230, a read only memory (ROM) 240, a storage device 250, an input device 260, an output device 270, and a communications interface 280.

Bus 210 may permit communication among the components of device 200. Processing logic 220 may include one or more processors and/or microprocessors that interpret and execute instructions. In some implementations, processing logic 220 may be implemented as or include one or more Application Specific Integrated Circuits (ASICs), Field Programmable Gate Arrays (FPGAs), or the like. Main memory 230 may include a Random Access Memory (RAM) or another type of dynamic storage device that stores information and instructions for execution by processing logic 220. ROM may include a ROM device and/or another type of static storage device that stores static information and instructions for the processing logic 220. Storage device 250 may include a magnetic or optical recording medium and its corresponding drive for storing information and/or instructions.

Input device 260 may include a device that permits an operator to input information to device 200, such as a keyboard, a keypad, a mouse, a pen, a microphone, one or more biometric mechanisms, a touch screen display, and/or other types of input devices. Output device 270 may include a device that outputs information to the operator, including a display, a printer, a speaker, etc.

Communication interface 280 may include any transceiver-like mechanism that enables device 200 to communicate with other devices and/or systems. For example, communication interface 280 may include mechanisms for communicating with another device or system via a network, such as network 130.

As will be described in detail below, device 200 may perform certain operations. Device 200 may perform these and other operations in response to processing logic 220 executing software instructions contained in a computer-readable medium, such as main memory 230. A computer-readable medium may correspond to, for example, a physical memory device or a logical memory device. A logical memory device may include memory space within a single physical memory device or spread across multiple physical memory devices residing on one or more devices.

The software instructions may be read into main memory 230 from another computer-readable medium, such as data storage device 250, or from another device via communication interface 280. The software instructions contained in main memory 230 may cause processing logic 220 to perform processes that will be described later. Alternatively, hardwired circuitry may be used in place of or in combination with software instructions to implement processes described herein. Thus, systems and methods described herein are not limited to any specific combination of hardware circuitry and software.

Although FIG. 2 illustrates exemplary components of device 200, in other implementations, device 200 may include fewer components, different components, differently arranged components, or additional components than those depicted in FIG. 2. Additionally, or alternatively, one or more components of device 200 may perform one or more tasks described as being performed by one or more other components of device 200.

Figure 3:
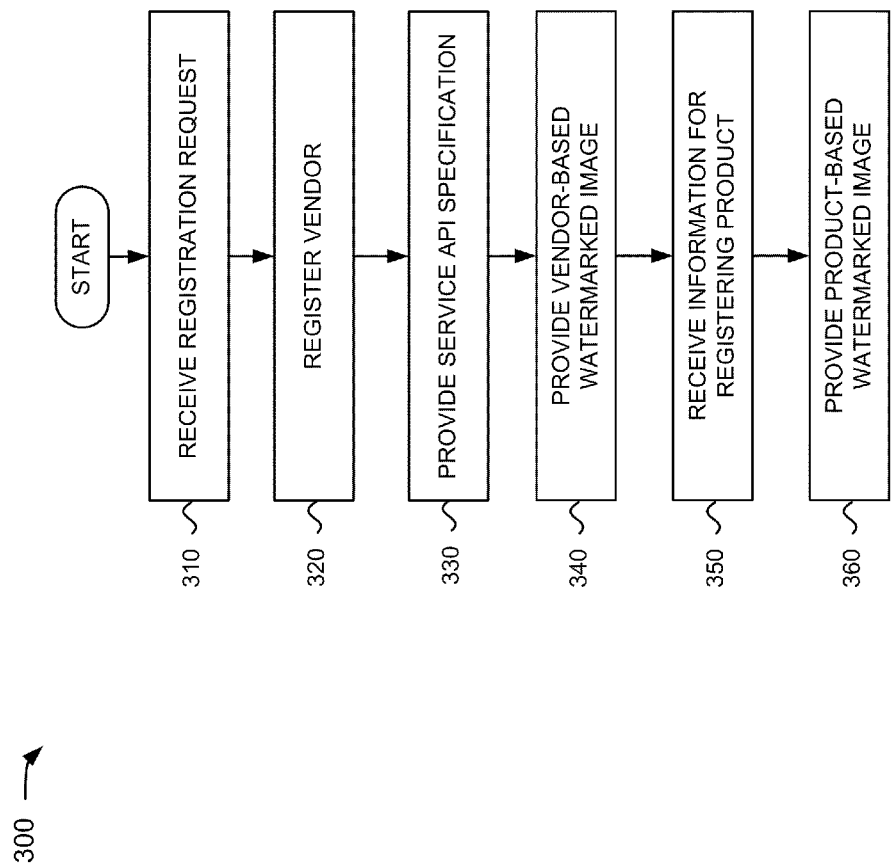
FIG. 3 is a flow chart of an exemplary process for registering a product.

FIG. 3 is a flow chart of an exemplary process 300 for registering a product. In one implementation, the processing of FIG. 3 may be performed by registration platform 120. In another implementation, some or all of the processing described below may be performed by one or more devices, including or excluding registration platform 120.

Process 300 may include receiving a registration request (block 310). For example, a vendor at a vendor device, such as vendor device 110-1, may connect to registration platform 120 via network 130. In one implementation, the vendor may connect to registration platform 120 by causing vendor device 110-1 to access a particular web page associated with registration platform 120. The vendor may then submit a registration request to registration platform 120 via the web page.

Process 300 may include registering the vendor (block 320). For example, registration platform 120 may provide one or more graphical user interfaces to the vendor (at vendor device 110-1) that allow the vendor to provide registration information, such as information identifying the vendor (e.g., a name of the vendor, the name of the vendor's business, an address of the vendor's business, etc.) and/or other types of information. In one implementation, registration platform 120 may require payment from a vendor to allow the vendor to register with registration platform 120. In this implementation, the registration information may also include financial information, such as credit card information, bank information, and/or other types of financial information.

Process 300 may also include providing a service Application Program Interface (API) specification (block 330). For example, registration platform 120 may, in response to registering the vendor, cause a service API specification to be provided to vendor device 110-1. The service API specification may allow the vendor to develop products based on the service API specification, which may allow the resulting products to perform functions described below.

Process 300 may further include providing a vendor-based watermark image (block 340). For example, registration platform 120 may transfer a vendor-based watermark image to vendor device 110-1. Registration platform 120 may transfer the vendor-based watermark image as a signal. The vendor may associate the vendor-based watermark image with the vendor's products that are registered with registration platform 120 to later enable authentication of the products by customers. In one implementation, the vendor-based watermark image may be generated using a Discrete Wavelet Transformation (DWT)-based technique, a geometric transformation technique, or another technique. In an alternative implementation, another type of vendor-based validation information may be provided to the vendor, such as a unique vendor encryption key.

Process 300 may include receiving information for registering a product (block 350). For example, the vendor (via vendor device 110-1) may provide information associated with a product of the vendor. The information may include, for example, a product name, a product serial number, and/or other types of information.

Process 300 may also include providing a product-based watermark image (block 360). For example, registration platform 120 may transfer a product-based watermark image to vendor device 110-1. Registration platform 120 may transfer the product-based watermark image as a signal. The vendor may associate the product-based watermark image with the vendor's product that is being registered to later enable authentication of the product by customers. In one implementation, the product-based watermark image may be generated using a DWT-based technique, a geometric transformation technique, or another technique. In an alternative implementation, another type of product-based validation information may be provided to the vendor, such as a unique product encryption key.

Although FIG. 3 shows exemplary blocks of process 300, in other implementations, process 300 may include fewer blocks, different blocks, differently arranged blocks, or additional blocks than depicted in FIG. 3.

Figure 4:
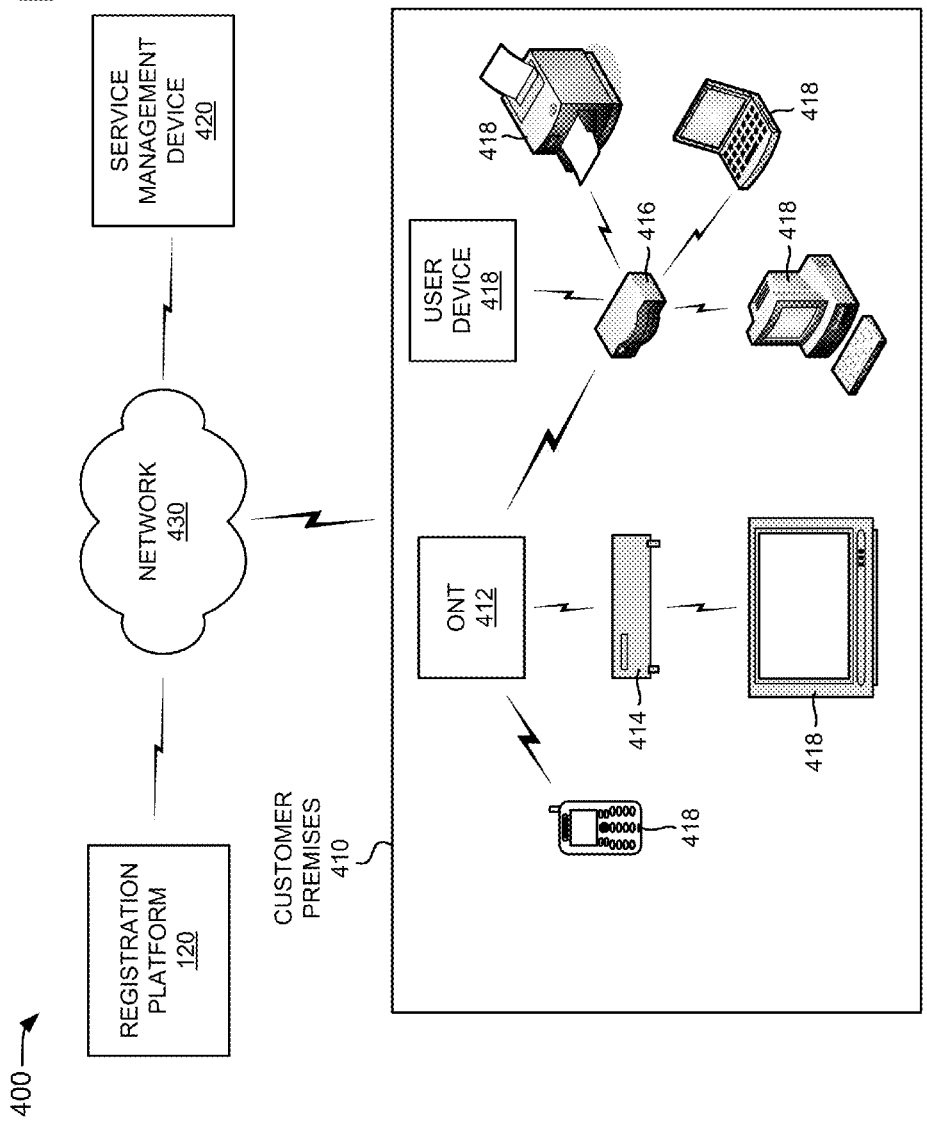
FIG. 4 is another exemplary environment in which systems and/or methods, described herein, may be implemented.

FIG. 4 is another exemplary environment 400 in which systems and/or methods, described herein, may be implemented. As illustrated, environment 400 may include customer premises 410 that may connect to registration platform 120 and a service management device 420 via a network 430.

Registration platform 120 may be configured in the manner described above. In one implementation, registration platform 120 may provide watermark validation information to customer premises 410. The watermark validation information may allow for authentication of components (or products) in customer premises 410.

Customer premises 410 may include a network associated with a customer. For example, the network may include a Wi-Fi network and/or another type of network that may be associated with a customer's premises. As illustrated, customer premises 410 may include the following exemplary components: an ONT 412, a set-top box 414, a router 416, and a group of user devices 418.

ONT 412 may include one or more devices that terminate an optical network and provide an interface between the optical network and a customer's premises (such as customer premises 410). In an exemplary implementation, ONT 412 may provide multiple service interfaces for the customer (e.g., ONT 412 may provide an interface for telephony (i.e., voice) services; an interface for Ethernet (i.e., data) services; an interface for television (i.e., video) services; etc.). As shown in FIG. 4, ONT 412 may demultiplex data to various components, such as set-top box 416, router 416, and user devices 418. ONT 412 may connect to other components of customer premises 410 via wired and/or wireless connections.

Set-top box 414 may include one or more devices that that provide programs to a display. Set-top box 414 may allow a user to alter the program provided to the display based on a signal (e.g., a channel up or channel down signal) from, for example, a remote control (not shown). Set-top box 414 may, in some implementations, include a digital video recorder or another type of recorder that may record a program. In another implementation, set-top box 414 may be associated with an external digital video recorder or another type of recorder, such as a video cassette recorder, or an external storage device. Set-top box 414 may connect to other components of customer premises 410 via wired and/or wireless connections.

Router 416 may include one or more devices that receive traffic from a component in customer premises 410 and route the traffic toward the appropriate destination(s). Router 416 may connect to other components in customer premises 410 via wired and/or wireless connections.

User devices 418 may include a laptop computer, a personal computer, a television, a Wi-Fi remote control, a Wi-Fi photo frame, a Wi-Fi printer, an appliance that includes Wi-Fi capabilities, a wireless telephone, a personal digital assistant (PDA) (e.g., that can include a radiotelephone, a pager, Internet/intranet access, etc.), and/or other types of devices that may connect to a network. User devices 418 may connect to other components in customer premises 410 via wired and/or wireless connections.

In one implementation, customer premises 410 may use the ZigBee standard (built on the IEEE 802.15.4 standard) to authenticate components in customer premises 410 and to enable services on authenticated components. In this implementation, ONT 412, set-top box 414, or router 416 may include a ZigBee coordinator. In addition, one or more of ONT 412, set-top box 414, or router 416 may correspond to a ZigBee full function device. User devices 418 may correspond to ZigBee reduced function devices.

Although FIG. 4 shows exemplary components of customer premises 410, in other implementations, customer premises 410 may include fewer components, different components, differently arranged components, or additional components than depicted in FIG. 4. Additionally, or alternatively, one or more components of customer premises 410 may perform the tasks described as being performed by one or more other components of customer premises 410.

Service management device 420 may include one or more devices that receive requests to authorize a service for a component in customer premises 410 and transmit information indicating that the service is permitted to be provided to the component or not permitted to be provided to the component. For example, service management device 420 may include a server, a personal computer, a laptop computer, a cellular telephone, and/or another type of computational or communication device. Service management device 420 may connect to network 430 via wired and/or wireless connections.

Network 430 may include one or more networks of any type, including a PLMN, a PSTN, a LAN, a MAN, a WAN, a private network, the Internet, an intranet, and/or another type of network. In one implementation, network 430 may include an optical network.

Although FIG. 4 shows exemplary components of environment 400, in other implementations, environment 400 may include fewer components, different components, differently arranged components, or additional components than depicted in FIG. 4. Additionally, or alternatively, one or more components of environment 400 may perform the tasks described as being performed by one or more other components of environment 400.

Figure 5:
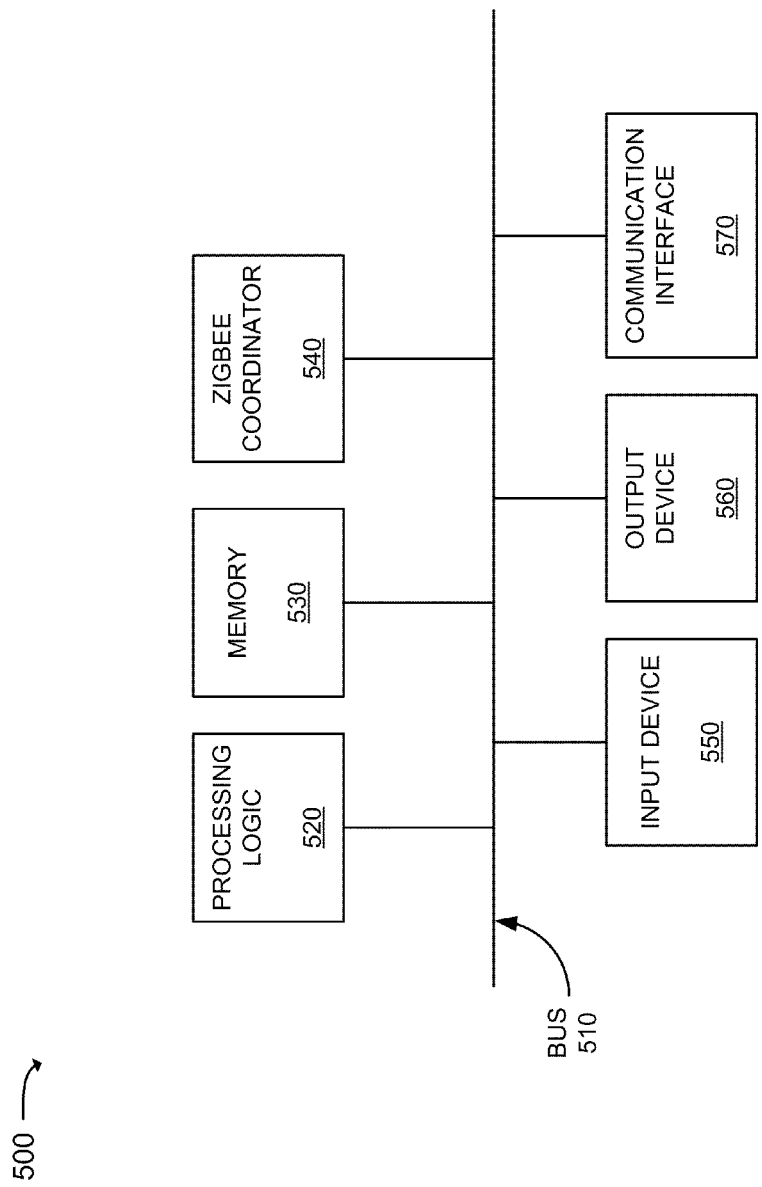
FIG. 5 is a diagram of exemplary components of one or more of an optical network terminal (ONT), a set-top box, or a wireless router of FIG. 4.

FIG. 5 is a block diagram of exemplary components of a device 500 that may correspond to ONT 412, set-top box 414, or router 416. As illustrated, device 500 may include a bus 510, processing logic 520, a memory 530, a ZigBee coordinator 540, an input device 550, an output device 560, and a communications interface 570.

Bus 510 may permit communication among the components of device 500. Processing logic 520 may include one or more processors and/or microprocessors that interpret and execute instructions. In some implementations, processing logic 520 may be implemented as or include one or more ASICs, FPGAs, or the like. Memory 530 may include a RAM or another type of dynamic storage device that stores information and instructions for execution by processing logic 520; a ROM device and/or another type of static storage device that stores static information and instructions for the processing logic 520; and/or a magnetic or optical recording medium and its corresponding drive for storing information and/or instructions.

ZigBee coordinator 540 may include a module that acts to form a ZigBee network in customer premises 410. For example, ZigBee coordinator 540 may choose the radio channel at which the components of the ZigBee network communicate, specify a specific Personal Area Network (PAN) identifier for use in the ZigBee network, and/or perform other functions for forming the ZigBee network. In addition, ZigBee coordinator 540 may store information about the components of the ZigBee network and determine the optimum path between each point in the network. In one implementation, ZigBee coordinator 540 may perform tasks related to authenticating a component in customer premises 410 and providing a service to an authenticated component in customer premises 410.

Input device 550 may include a device that permits an operator to input information to device 500, such as a keyboard, a keypad, a mouse, a pen, a microphone, one or more biometric mechanisms, a touch screen display, and/or other types of input devices. Output device 560 may include a device that outputs information to the operator, including a display, a printer, a speaker, etc.

Communication interface 570 may include any transceiver-like mechanism that enables device 500 to communicate with other devices and/or systems. For example, communication interface 570 may include mechanisms for communicating with another component within customer premises 410.

As will be described in detail below, device 500 may perform certain operations. Device 500 may perform these and other operations in response to processing logic 520 executing software instructions contained in a computer-readable medium, such as memory 530. The software instructions may be read into memory 530 from another computer-readable medium or from another device via communication interface 570. The software instructions contained in memory 530 may cause processing logic 520 to perform processes that will be described later. Alternatively, hardwired circuitry may be used in place of or in combination with software instructions to implement processes described herein. Thus, systems and methods described herein are not limited to any specific combination of hardware circuitry and software.

Although FIG. 5 illustrates exemplary components of device 500, in other implementations, device 500 may include fewer components, different components, differently arranged components, or additional components than those depicted in FIG. 5. Additionally, or alternatively, one or more components of device 500 may perform one or more tasks described as being performed by one or more other components of device 500.

Figure 6:
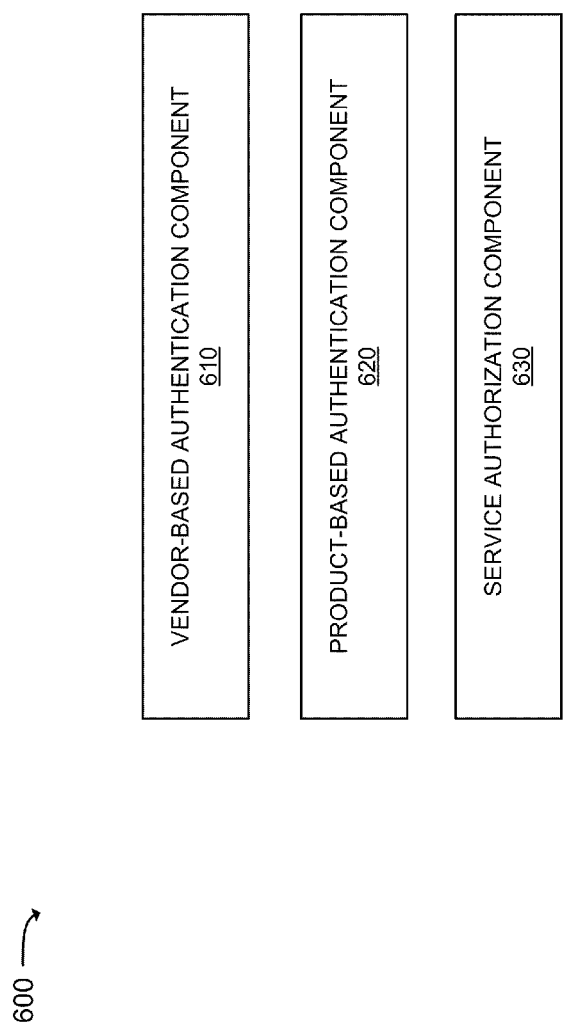
FIG. 6 is a diagram of exemplary functional components of one or more of the ONT, the set-top box, or the wireless router of FIG. 4.

FIG. 6 is a diagram of exemplary functional components of a device 600 that may correspond to ONT 412, set-top box 414, or router 416. In one implementation, device 600 may correspond to device 500 (i.e., the functional components illustrated in FIG. 6 may be implemented in the same component of customer premises 410 that includes ZigBee coordinator 540). In another implementation, device 600 may correspond to a component of customer premises 410 that does not include ZigBee coordinator 540. In still another implementation, one or more of the functional components illustrated in FIG. 6 may be implemented in a component of customer premises 410 that includes ZigBee coordinator 540 and one or more other functional components illustrated in FIG. 6 may be implemented in a component of customer premises 410 that does not include ZigBee coordinator 540. For example, vendor-based authentication component 610 and product-based authentication component 620 may be implemented in the component of customer premises 410 that includes ZigBee coordinator 540 and service authorization component 630 may be implemented in a component that customer premises 410 that does not include ZigBee coordinator 540.

As illustrated, device 600 may include a vendor-based authentication component 610, a product-based authentication component 620, and a service authorization component 630. Vendor-based authentication component 610 may be implemented in hardware or a combination of hardware and software. Vendor-based authentication component 610 may authenticate components in customer premises 410 based on a vendor-based watermark image. For example, vendor-based authentication component 610 may receive a vendor-based watermark image from a component in customer premises 410 and may use, for example, a DWT technique to authenticate the vendor with which the component is associated.

Product-based authentication component 620 may be implemented in hardware or a combination of hardware and software. Product-based authentication component 620 may authenticate components in customer premises 410 based on a product-based watermark image. For example, product-based authentication component 620 may receive a product-based watermark image from a component in customer premises 410 and may use, for example, a DWT technique to authenticate the component.

Service authorization component 630 may be implemented in hardware or a combination of hardware and software. Service authorization component 630 may authorize services on components in customer premises 410. For example, service authorization component 630 may receive a request to authorize a service on a component of customer premises 410 and determine whether to authorize the service. In one implementation, service authorization component 630 may authorize a service by, for example, sending a service authorization request to service management device 420. A user may access service management device 420 (e.g., by accessing a particular web page or logging into a particular portal associated with service management device 420) to view the request and may provide an indication of whether or not the service is authorized. Service management device 420 may then send a response to service authorization component 630, indicating whether or not the service may be provided to the component. Alternatively, service authorization component 630 may obtain an indication of whether or not a service may be provided to a component by, for example, sending an authorization request directly to the user (e.g., to a cellular telephone or another device associated with the user). Service authorization component 630 may alternatively obtain authorization of a service for a component in other ways. In addition, service authorization component 630 may revoke, in response to a request from a user, a service being provided to a component.

Although FIG. 6 shows exemplary functional components of device 600, in other implementations, device 600 may include fewer functional components, different functional components, differently arranged functional components, or additional functional components than depicted in FIG. 6. Additionally, or alternatively, one or more functional components of device 600 may perform the tasks described as being performed by one or more other functional components of device 600.

Figure 7:
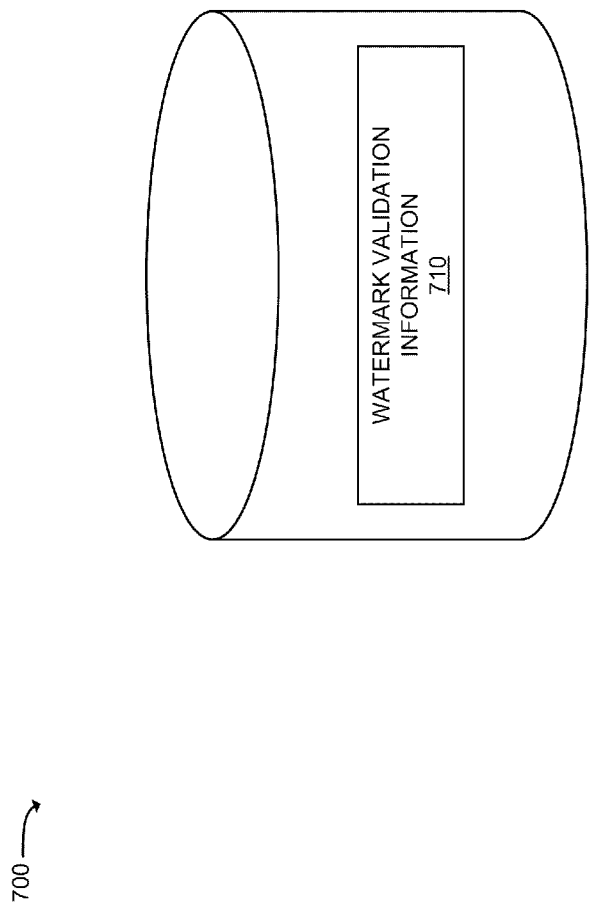
FIG. 7 is a diagram of a portion of an exemplary computer-readable medium that may be associated with one or more of the ONT, the set-top box, or the wireless router of FIG. 4.

FIG. 7 is a portion of an exemplary computer-readable medium 700 that may be associated with device 600. Additionally, or alternatively, computer-readable medium 700 may be associated with another device or group of devices. While one computer-readable medium is described below, it will be appreciated that computer-readable medium 700 may include multiple computer-readable media stored locally at device 600, or stored at one or more different and possibly remote locations.

As illustrated, computer-readable medium 700 may include watermark validation information. In one implementation, the watermark validation information may include DWT coefficients. Alternatively, the watermark validation information may include other types of validation information, such as decryption keys. The watermark validation information may be associated with vendor-based watermark images and product-based watermark images that were provided in connection with process 300, described above with respect to FIG. 3. In one implementation, computer-readable medium 700 may receive the watermark validation information periodically (e.g., as a download from registration platform 120), in response to a user at customer premises 410 requesting updated watermark validation information, and/or at other times. In some implementations, the watermark validation information may be associated, in computer-readable medium 700, with information identifying the component, of customer premises 410, with which the watermark validation information is associated. The component identification information may include, for example, a serial number of the component.

Although FIG. 7 shows exemplary portions that may be maintained in computer-readable medium 700, in other implementations, computer-readable medium 700 may store different information or additional information than depicted in FIG. 7.

Figure 8:
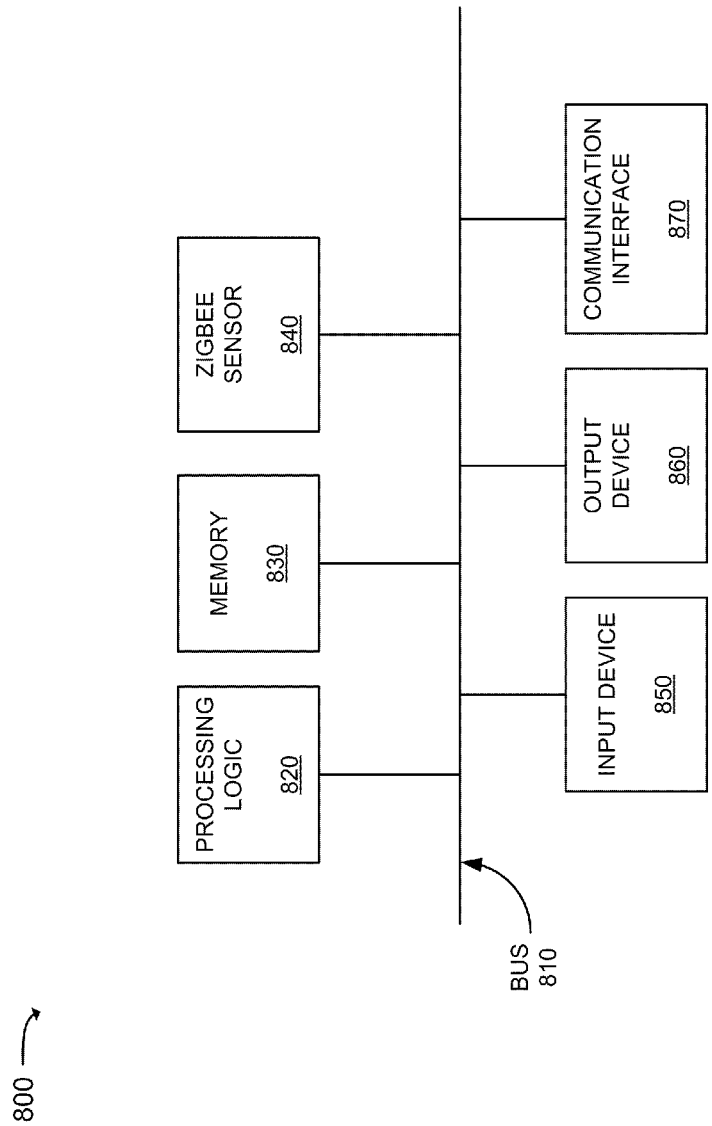
FIG. 8 is a diagram of exemplary components of a user device of FIG. 4.

FIG. 8 is a block diagram of exemplary components of a device 800 that may correspond to a user device 418 of FIG. 4. As illustrated, device 800 may include a bus 810, processing logic 820, a memory 830, a ZigBee sensor 840, an input device 850, an output device 860, and a communications interface 870.

Bus 810 may permit communication among the components of device 800. Processing logic 820 may include one or more processors and/or microprocessors that interpret and execute instructions. In some implementations, processing logic 820 may be implemented as or include one or more ASICs, FPGAs, or the like. Memory 830 may include a RAM or another type of dynamic storage device that stores information and instructions for execution by processing logic 820; a ROM device and/or another type of static storage device that stores static information and instructions for the processing logic 820; and/or a magnetic or optical recording medium and its corresponding drive for storing information and/or instructions.

ZigBee sensor 840 may include a module that acts to authenticate device 800. For example, ZigBee sensor 840 may send information to ZigBee coordinator 540 to authenticate device 800. The information may include, for example, information identifying device 800 (such as a serial number), the vendor-based watermark image with which device 800 is associated, the product-based watermark image with which device 800 is associated, and/or other information that may aid in authenticating device 800. In addition, ZigBee sensor 840 may include a module that acts to activate services for device 800. For example, ZigBee sensor 840 may send information identifying device 800 and information relating to a service to be activated for device 800.

Input device 850 may include a device that permits an operator to input information to device 800, such as a keyboard, a keypad, a mouse, a pen, a microphone, one or more biometric mechanisms, a touch screen display, and/or other types of input devices. Output device 860 may include a device that outputs information to the operator, including a display, a printer, a speaker, etc. In one implementation, device 800 may be a headless device and, thus, would not include a display.

Communication interface 870 may include any transceiver-like mechanism that enables device 800 to communicate with other devices and/or systems. For example, communication interface 870 may include mechanisms for communicating with another component within customer premises 410.

As will be described in detail below, device 800 may perform certain operations. Device 800 may perform these and other operations in response to processing logic 820 executing software instructions contained in a computer-readable medium, such as memory 830. The software instructions may be read into memory 830 from another computer-readable medium or from another device via communication interface 870. The software instructions contained in memory 830 may cause processing logic 820 to perform processes that will be described later. Alternatively, hardwired circuitry may be used in place of or in combination with software instructions to implement processes described herein. Thus, systems and methods described herein are not limited to any specific combination of hardware circuitry and software.

Although FIG. 8 illustrates exemplary components of device 800, in other implementations, device 800 may include fewer components, different components, differently arranged components, or additional components than those depicted in FIG. 8. Additionally, or alternatively, one or more components of device 800 may perform one or more tasks described as being performed by one or more other components of device 800.

Figure 9:
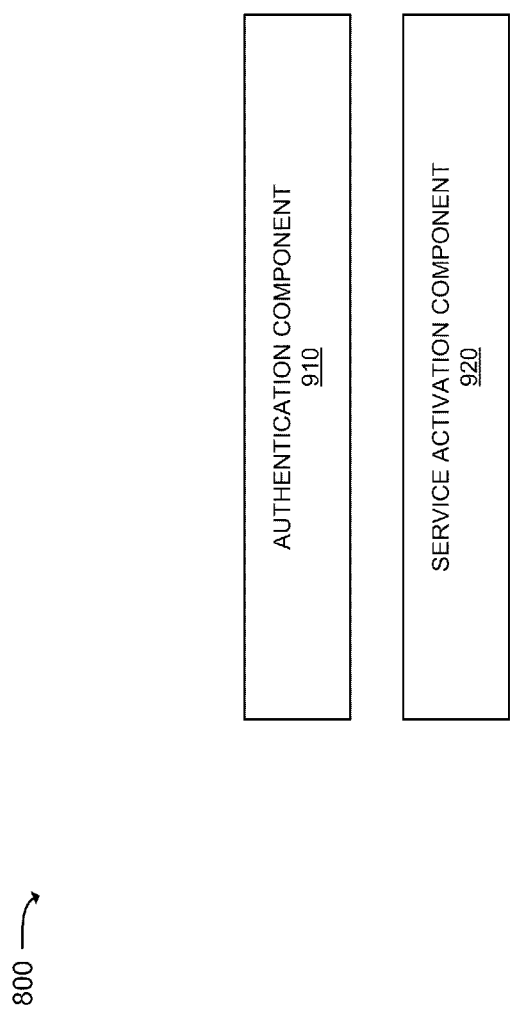
FIG. 9 is a diagram of exemplary functional components of the user device of FIG. 4.

FIG. 9 is a diagram of exemplary functional components of device 800. The functional components shown in FIG. 9 may be implemented, for example, by one or more components illustrated in FIG. 8. As illustrated, device 800 may include an authentication component 910 and a service activation component 920.

Authentication component 910 may include one or more functional components that act to authenticate device 800 in customer premises 410. For example, in one implementation, authentication component 910 may send authentication information to ZigBee coordinator 540. The authentication information may include, for example, a vendor-based watermark image and a product-based watermark image with which device 800 is associated. Authentication component 910 may send the authentication information to ZigBee coordinator 540 in response to an event, such as when device 800 is first powered on in customer premises 410, any time that device 800 is powered on in customer premises 410, a command from a user, and/or in response to other events.

Service activation component 920 may include one or more functional components that activate a service for device 800. For example, service activation component 920 may send a request to ZigBee coordinator 540 to authenticate the service for device 800. The request may include, for example, information identifying device 800 and information relating to the service to be authenticated. Service activation component 920 may send the request in response to device 800 being properly authenticated by authentication component 910, in response to a command from a user of device 800, and/or in response to another event.

Although FIG. 9 shows exemplary functional components of device 800, in other implementations, device 800 may include fewer functional components, different functional components, differently arranged functional components, or additional functional components than depicted in FIG. 9. Additionally, or alternatively, one or more functional components of device 800 may perform the tasks described as being performed by one or more other functional components of device 800.

Figure 10A:
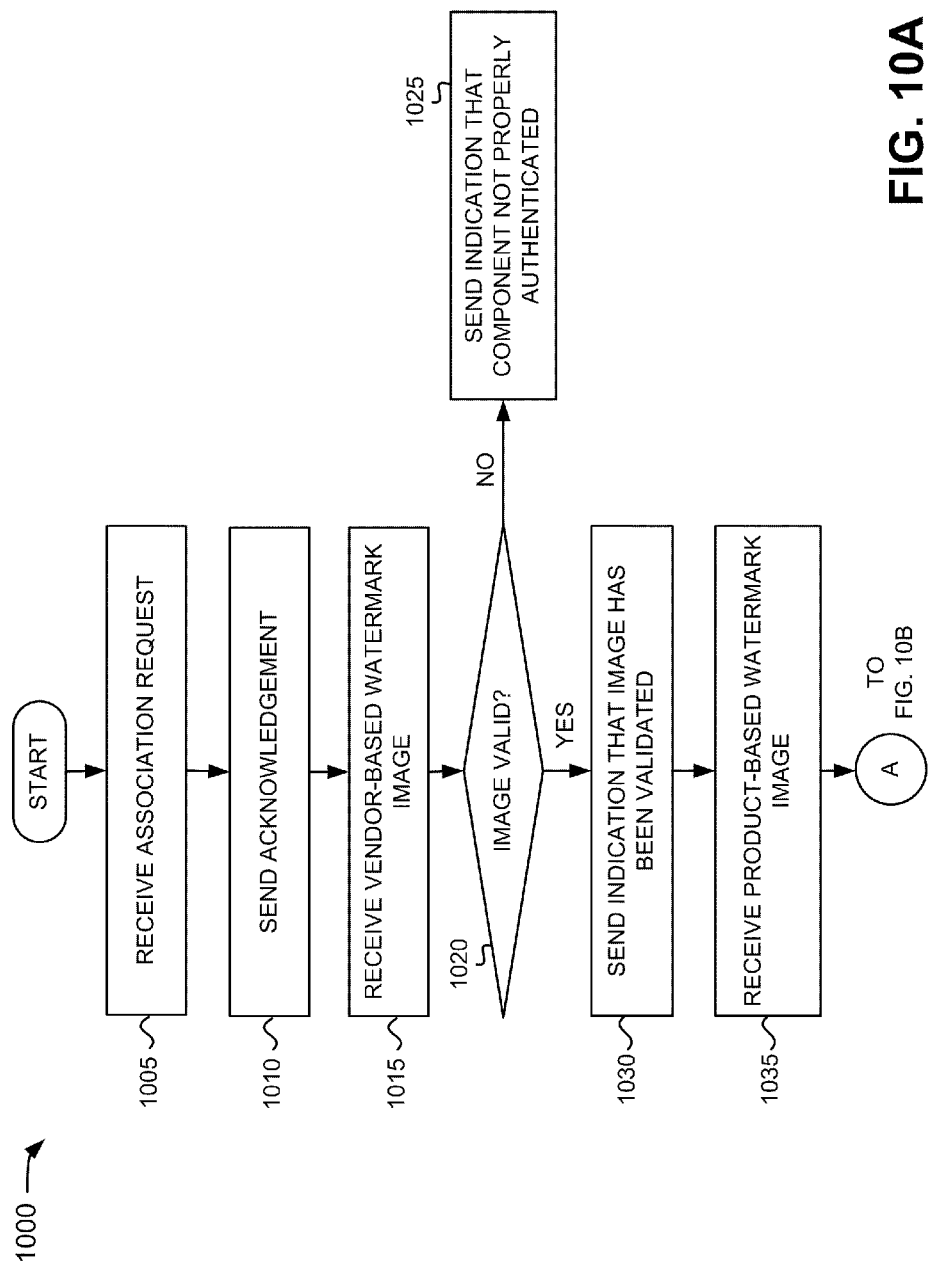
FIGS. 10A and 10B are a flow chart of an exemplary process for authenticating a user device.
Figure 10B:
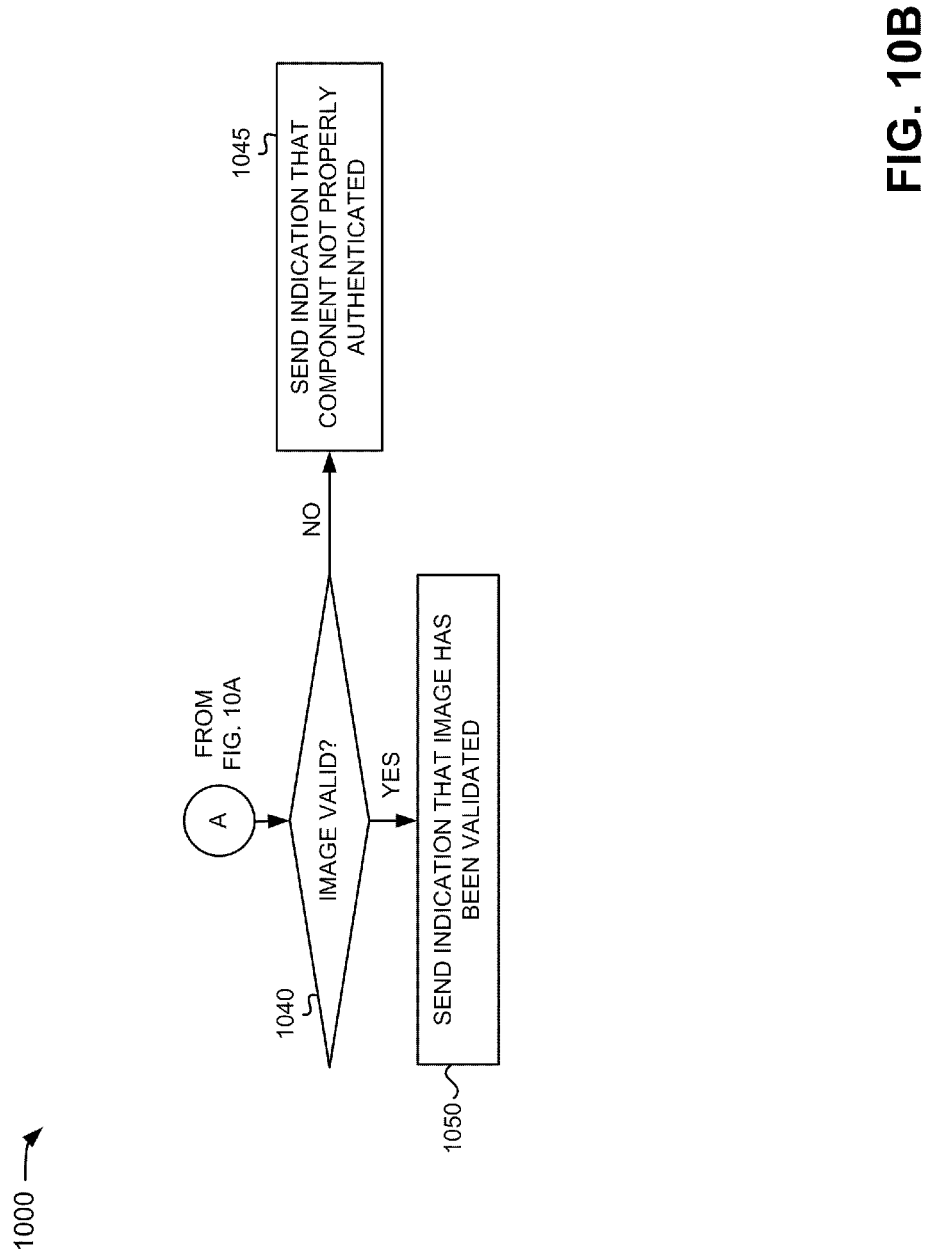

FIGS. 10A and 10B are a flow chart of an exemplary process 1000 for authenticating a user device. In one embodiment, the processing of FIGS. 10A and 10B may be performed by device 500 and/or device 600. In another embodiment, some or all of the processing described below may be performed by one or more devices, including or excluding devices 500 and 600.

Process 1000 may include receiving an association request (block 1005, FIG. 10A). For example, ZigBee sensor 840 of a user device, such as a user device 418, may send an association request to ZigBee coordinator 540. ZigBee sensor 840 may transmit the association request automatically (e.g., in response to an event, such as user device 418 attempting to join the ZigBee network in customer premises 410) or in response to a command from a user. The association request may include, for example, a Manufacturer-Specific Profile (MSP) identifier, a cluster identifier, and/or other information relating to or identifying user device 418 (such as a serial number of user device 418). ZigBee coordinator 540 may receive the association request.

Process 1000 may further include sending an acknowledgement (block 1010). For example, assume hereinafter that a user has set ZigBee coordinator 540 to accept new component associations. ZigBee coordinator 540 may transmit, in response to receiving the association request, an acknowledgement message back to ZigBee sensor 840.

Process 1000 may also include receiving a vendor-based watermark image (block 1015). For example, authentication component 910 may cause ZigBee sensor 840 to send the vendor-based watermark image with which user device 418 is associated. ZigBee coordinator 540 may receive the vendor-based watermark image.

Process 1000 may include determining whether the vendor-based watermark image has been validated (block 1020). For example, ZigBee coordinator 540 may pass the vendor-based watermark image to vendor-based authentication component 610. Vendor-based authentication component 610 may retrieve the appropriate watermark validation information from computer-readable medium 700 (e.g., based on the serial number of user device 418) and validate the vendor, with which user device 418 is associated, by validating the received vendor-based watermark image using the retrieved watermark validation information. In one implementation, vendor-based authentication component 610 may validate the received vendor-based watermark image using a DWT-based technique.

If vendor-based authentication component 610 determines that the received vendor-based watermark image is invalid (block 1020—NO), process 1000 may include sending an indication that the component has not been properly authenticated (block 1025). For example, vendor-based authentication component 610 may cause a message, indicating that the authentication of user device 418 has failed, to be sent to user device 418 and/or another device associated with the user (e.g., to the user's cellular telephone, computer, another component of customer premises 410, etc.).

If, on the other hand, vendor-based authentication component 610 determines that the received vendor-based watermark image is valid (block 1020—YES), process 1000 may include sending an indication that the received vendor-based watermark image is valid (block 1030). For example, vendor-based authentication component 610 may cause ZigBee coordinator 540 to send a message, indicating that the vendor-based watermark is valid, to ZigBee sensor 840 of user device 418.

Process 1000 may further include receiving a product-based watermark image (block 1035). For example, authentication component 910 may cause ZigBee sensor 840 to send the product-based watermark image with which user device 418 is associated. ZigBee coordinator 540 may receive the product-based watermark image.

Process 1000 may include determining whether the product-based watermark image has been validated (block 1040, FIG. 10B). For example, ZigBee coordinator 540 may pass the product-based watermark image to product-based authentication component 620. Product-based authentication component 620 may retrieve the appropriate watermark validation information from computer-readable medium 700 (e.g., based on the serial number of user device 418) and validate user device 418, by validating the received product-based watermark image using the retrieved watermark validation information. In one implementation, product-based authentication component 620 may validate the received product-based watermark image using a DWT-based technique.

If product-based authentication component 620 determines that the received product-based watermark image is invalid (block 1040—NO), process 1000 may include sending an indication that the component has not been properly authenticated (block 1045). For example, product-based authentication component 620 may cause a message, indicating that the authentication of user device 418 has failed, to be sent to user device 418 and/or another device associated with the user (e.g., to the user's cellular telephone, computer, another component of customer premises 410, etc.).

If, on the other hand, product-based authentication component 620 determines that the received product-based watermark image is valid (block 1040—YES), process 1000 may include sending an indication that the received product-based watermark image is valid (block 1050). For example, product-based authentication component 620 may cause ZigBee coordinator 540 to send a message, indicating that the product-based watermark is valid, to ZigBee sensor 840 of user device 418. Once vendor-based authentication component 610 has validated the vendor-based watermark image and product-based authentication component 620 has validated the product-based watermark image, user device 418 has been properly authenticated and may be permitted to join the ZigBee network.

Although FIGS. 10A and 10B show exemplary blocks of process 1000, in other implementations, process 1000 may include fewer blocks, different blocks, differently arranged blocks, or additional blocks than depicted in FIGS. 10A and 10B.

FIG. 11 is a flow chart of an exemplary process 1100 for activating a service on a user device. In one embodiment, the processing of FIG. 11 may be performed by device 500 and/or device 600. In another embodiment, some or all of the processing described below may be performed by one or more devices, including or excluding devices 500 and 600.

Process 1100 may include receiving a service request (block 1105). Assume, as described above with respect to FIGS. 10A and 10B, that user device 418 has joined the ZigBee network. Service activation component 920, of user device 418, may cause ZigBee sensor 840 to send a service request to ZigBee coordinator 540. The service request may include information identifying user device 418 (e.g., a serial number of user device 418), information identifying the service being requested, and/or other types of information. The service may include any type of service that may be provided in a network. For example, the service may include a Wi-Fi service and the service request may include a request for the Wi-Fi service. In this situation, the service request may include a Media Access Control (MAC) identifier, a Wi-Fi chipset identifier, and/or other information that may be useful in connecting user device 418 to the Wi-Fi network.

Process 1100 may further include sending a request to authorize the service (block 1110). For example, in one implementation, all service requests are to be authorized by a user (e.g., an administrator or other designated user) of customer premises 410. In another implementation, only particular service requests or no service requests need be authorized by the user. When authorization is needed, ZigBee coordinator 540 may cause a message to be transmitted to the user to obtain authorization, from the user, for the service requested by user device 418. In one implementation, ZigBee coordinator 540 may send a service authorization request to service authorization component 630. Service authorization component 630 may then transmit the message to the user. The message may include a Short Message Service (SMS) message or an electronic mail message. The message may be transmitted directly to the user (e.g., to the user's cellular telephone) for authorization or may include an indication to the user to log into service management device 420 to authorize the service.

Process 1100 may also include determining whether the service has been authorized (block 1115). For example, service authorization component 630 may receive an indication from the user (either from the user's cellular telephone (or other device) or from service management device 420) indicating whether or not the service is authorized.

If service authorization component 630 determines that the service has not been authorized (block 1115—NO), process 1100 may include sending an indication that the service has not been authorized (block 1120). For example, service authorization component 630 may send a confirmation message, indicating that the service has not been authorized for user device 418, to user device 418 and/or another device associated with the user (e.g., to the user's cellular telephone, computer, another component of customer premises 410, etc.).

If, on the other hand, service authorization component 630 determines that the service has been authorized (block 1115—YES), process 1100 may include sending an indication that the service request has been accepted (block 1125). For example, service authorization component 630 may cause ZigBee coordinator 540 to send a message, indicating that the service request has been accepted, to ZigBee sensor 840 of user device 418.

Process 1100 may further include activating the service on the component (block 1130). For example, ZigBee coordinator 540 may send information regarding the requested service to ZigBee sensor 840 of user device 418 to allow user device 418 to activate the service. For example, ZigBee coordinator 540 may provide Wi-Fi parameters that allow user device 418 to connect to a Wi-Fi network. User device 418 may connect to the Internet or intranet and/or exchange data with another component of customer premises 410 to begin using the service.

Although FIG. 11 shows exemplary blocks of process 1100, in other implementations, process 1100 may include fewer blocks, different blocks, differently arranged blocks, or additional blocks than depicted in FIG. 11.

Figure 12:
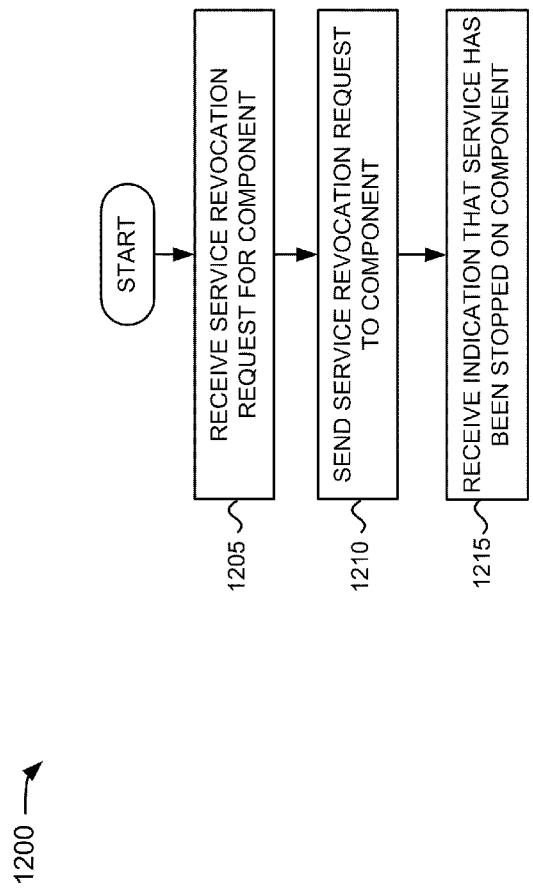
FIG. 12 is a flow chart of an exemplary process for revoking a service on a user device.

FIG. 12 is a flow chart of an exemplary process 1200 for deactivating a service on a user device. In one embodiment, the processing of FIG. 12 may be performed by device 500 and/or device 600. In another embodiment, some or all of the processing described below may be performed by one or more devices, including or excluding devices 500 and 600.

Process 1200 may include receiving a service revocation request for a component (block 1205). For example, a user may send an indication to service authorization component 630 that a particular service is to be revoked for a particular component of customer premises 410. To send the indication, the user may access a particular web page or log into a particular portal associated with service management device 420 and cause the indication to be sent from service management device 420.

Process 1200 may further include sending a service revocation request to the component (block 1210). For example, service authorization component 630 may cause ZigBee coordinator 540 to send a request to revoke a service to ZigBee sensor 840 of the appropriate user device 418. The request may include information identifying the service to be revoked.

Process 1200 may also include receiving an indication that the service has been stopped on the component (block 1215). For example, in response to receiving the request, user device 418 may deactivate the service. User device 418 may cause ZigBee sensor 840 to send an indication, to ZigBee coordinator 540, confirming that the service has been stopped on user device 418. ZigBee coordinator 540 may pass the confirmation on to service authorization component 630. Service authorization component 630 may then terminate providing the service to user device 418. In the event that the service being revoked is the ability of user device 418 to connect to the Wi-Fi network of customer premises 410, then service authorization component 630 may, for example, disconnect user device 418 from the Wi-Fi network.

Although FIG. 12 shows exemplary blocks of process 1200, in other implementations, process 1200 may include fewer blocks, different blocks, differently arranged blocks, or additional blocks than depicted in FIG. 12.

Figure 13:
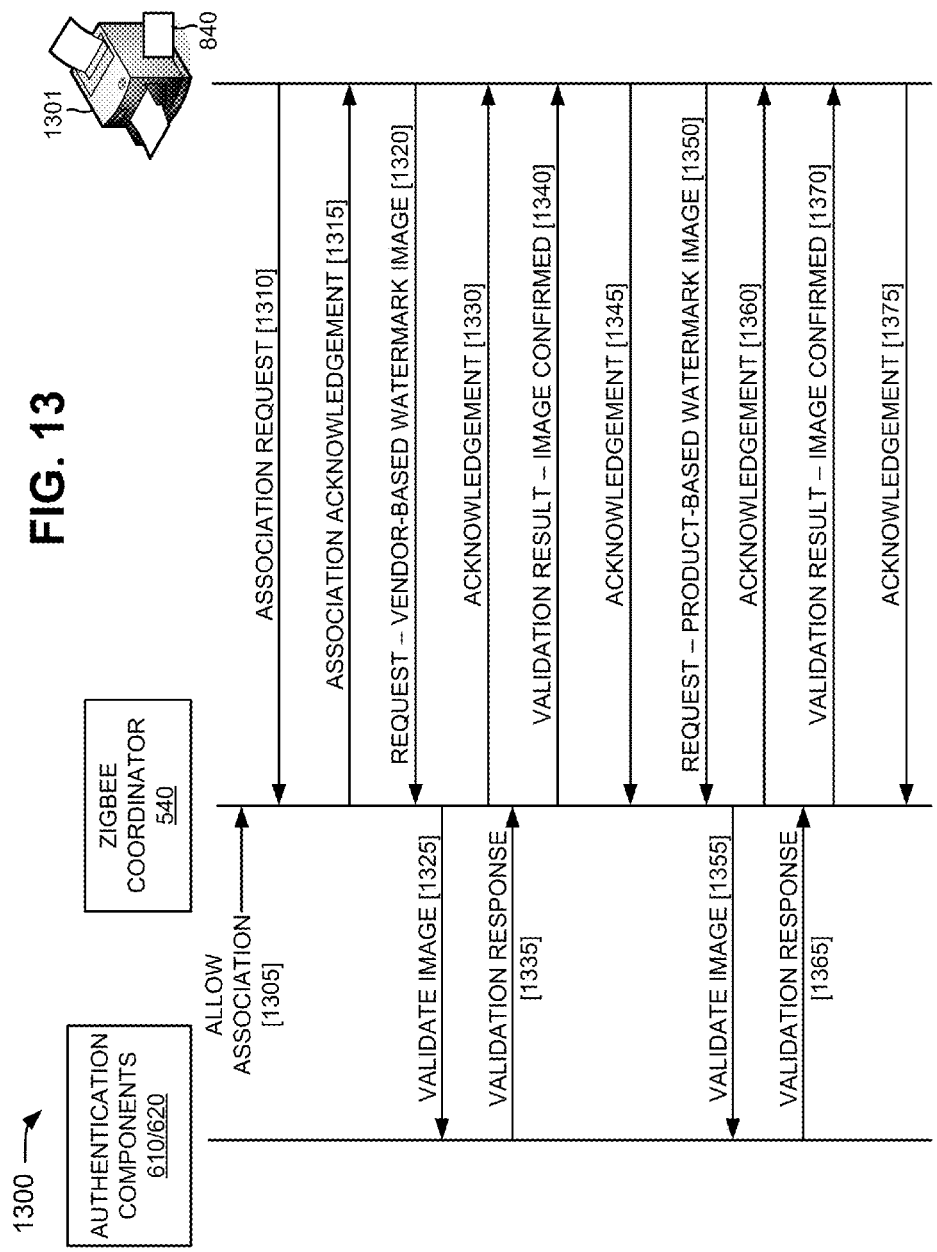
FIG. 13 is an example of the process described in FIGS. 10A and 10B.
Figure 14:
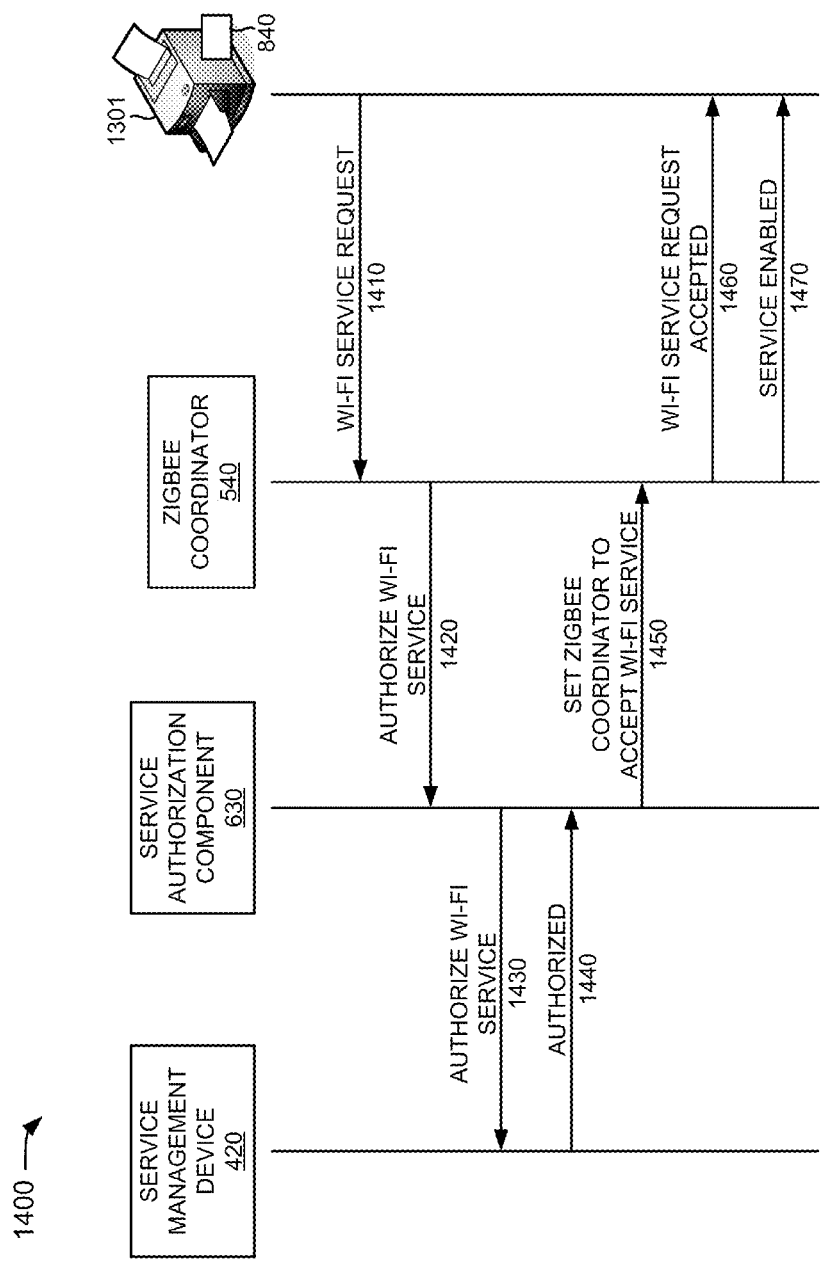
FIG. 14 is an example of the process described in FIG. 11.

FIG. 13 is an example 1300 of the processing described above with respect to FIGS. 10A and 10B. FIG. 14 is an example 1400 of the processing described above with respect to FIG. 11. FIG. 15 is an example 1500 of the processing described above with respect to FIG. 12.

In example 1300, assume that a user, of customer premises 410, has purchased a wireless printer 1301, which includes a ZigBee sensor 840, from a vendor that has registered the product in the manner described above with respect to FIG. 3. Thus, wireless printer 1301 may be associated with a vendor-based watermark image and a product-based watermark image. Assume further that the user desires to connect wireless printer 1301 to the user's Wi-Fi network, within customer premises 410. The user may provide an indication to ZigBee coordinator 540 to allow new components to be added to the ZigBee network (block 1305).

Wireless printer 1301 (e.g., ZigBee sensor 840) may provide an association request to ZigBee coordinator 540 (block 1310). The association request may include, for example, a Manufacturer-Specific Profile (MSP) identifier, a cluster identifier, and/or other information relating to or identifying user device 418 (such as a serial number of user device 418). In response to receiving the association request, ZigBee coordinator 540 may send an acknowledgement back to ZigBee sensor 840 of wireless printer 1301 (block 1315).

Wireless printer 1301 (e.g., ZigBee sensor 840) may send the vendor-based watermark image to ZigBee coordinator 540 (block 1320). ZigBee coordinator 540 may request that vendor-based authentication component 610 validate the received vendor-based watermark image (block 1325) and send an acknowledgement back to ZigBee sensor 840, indicating that the vendor-based watermark image has been received (block 1330).

Vendor-based authentication component 610 may validate the vendor-based watermark image using, for example, the appropriate watermark validation information from computer-readable medium 700. Assume that vendor-based authentication component 610 properly validates the received vendor-based watermark image. Vendor-based authentication component 610 may send a validation response to ZigBee coordinator 540, indicating that the validation was successful (block 1335). In turn, ZigBee coordinator 540 may send a validation result message to ZigBee sensor 840, indicating that the image has been confirmed (block 1340). Wireless printer 1301 (e.g., ZigBee sensor 840) may send an acknowledgement back to ZigBee coordinator 540 in response to receiving the validation result message (block 1345).

Wireless printer 1301 (e.g., ZigBee sensor 840) may send the product-based watermark image to ZigBee coordinator 540 (block 1350). ZigBee coordinator 540 may request that product-based authentication component 620 validate the received product-based watermark image (block 1355) and send an acknowledgement back to ZigBee sensor 840, indicating that the product-based watermark image has been received (block 1360).

Product-based authentication component 620 may validate the product-based watermark image using, for example, the appropriate watermark validation information from computer-readable medium 700. Assume that product-based authentication component 620 properly validates the received product-based watermark image. Product-based authentication component 620 may send a validation response to ZigBee coordinator 540, indicating that the validation was successful (block 1365). In turn, ZigBee coordinator 540 may send a validation result message to ZigBee sensor 840, indicating that the image has been confirmed (block 1370). Wireless printer 1301 (e.g., ZigBee sensor 840) may send an acknowledgement back to ZigBee coordinator 540 in response to receiving the validation result message (block 1375). At this point, wireless printer 1301 is ready to accept a service (e.g., wireless printer 1301 is ready to connect to the Wi-Fi network).

Turning now to example 1400 in FIG. 14, wireless printer 1301 (e.g., ZigBee sensor 840) may send a Wi-Fi service request to ZigBee coordinator 540 (block 1410). The service request may include information identifying wireless printer 1301 (e.g., a serial number of wireless printer 1301 or other types of information), information indicating that wireless printer 1301 desires to be connected to the Wi-Fi network, and/or other information relating to wireless printer 1301 and/or the desired service (e.g., a MAC identifier, a Wi-Fi chipset identifier, and/or other information). ZigBee coordinator 540 may send a request to authorize the Wi-Fi service to service authorization component 920 (block 1420).

Service authorization component 920 may then obtain authorization for the requested Wi-Fi service. In example 1400, assume that service authorization component 920 sends a service authorization request to service management device 420 (block 1430). The service authorization request may include information identifying wireless printer 1301 and the service being requested by wireless printer 1301. Service authorization component 630 may further provide a notice to the user to access a particular web page or log into a particular portal, associated with service management device 420, to authorize the service. Assume that the user authorizes the Wi-Fi service for wireless printer 1301. Service management device 420 may send an authorization message to service authorization component 630 (block 1440). In response, service authorization component 630 may set ZigBee coordinator 540 to accept the Wi-Fi service (block 1450).

ZigBee coordinator 540 may send a message to wireless printer 1301 (e.g., ZigBee sensor 840) that the Wi-Fi service request has been accepted (block 1460). ZigBee coordinator 540 may then provide a service enabled message to wireless printer 1301 (e.g., ZigBee sensor 840) that includes parameters relating to the Wi-Fi service (block 1470). Wireless printer 1301 may use the parameters to connect to the Wi-Fi network.

Assume, in example 1500 of FIG. 15, that at some later point in time, the user desires to disconnect wireless printer 1301 from the Wi-Fi network. The user may, for example, access a particular web page or log into a portal associated with service management device 420. The user may provide an indication that wireless printer 1301's access to the Wi-Fi network is being revoked. In response, service management device 420 may provide a request to service authorization component 630 to revoke wireless printer 1301's access to the Wi-Fi network (block 1510). The request may include information relating to wireless printer 1301 and the service that is being revoked.

Service authorization component 630 may receive the service revocation request and may set ZigBee coordinator 540 to revoke the Wi-Fi service of wireless printer 1301 (block 1520). In response, ZigBee coordinator 540 may send a Wi-Fi service revocation request to wireless printer 1301 (e.g., to ZigBee sensor 840) (block 1530). The Wi-Fi service revocation request may include information identifying the Wi-Fi service. In response to receiving the request, wireless printer 1301 may deactivate the Wi-Fi service at wireless printer 1301. Wireless printer 1301 (e.g., ZigBee sensor 840) may send an indication to ZigBee coordinator 540 confirming that the Wi-Fi service has been deactivated at wireless printer 1301 (block 1540).

ZigBee coordinator 540 may send a notice to service authorization component 630 indicating that wireless printer 1301's Wi-Fi service has been deactivated (block 1550). In response, service authorization component 630 may disconnect wireless printer 1301 from the Wi-Fi network. Service authorization component 630 may send a notification to the user (e.g., through service management device 420 or directly to a device of the user) that wireless printer 1301's wireless service has been successfully revoked (block 1560).

Systems and methods, as described herein, authenticate components in a customer's premises and activate and deactivate services on authenticated components via communications over a ZigBee network.

The foregoing description of embodiments provides illustration and description, but is not intended to be exhaustive or to limit the invention to the precise form disclosed. Modifications and variations are possible in light of the above teachings or may be acquired from practice of the invention. For example, while not described above, it will be appreciated that communications between ZigBee coordinator 540 and ZigBee sensor 840 may be encrypted. Thus, ZigBee coordinator 540 may encrypt communications sent to ZigBee sensor 840 and ZigBee sensor 840 may decrypt the communications. In addition, ZigBee sensor 840 may encrypt communications sent to ZigBee coordinator 540 and ZigBee coordinator 540 may decrypt the communications.

While series of blocks have been described with regard to FIGS. 3 and 10A-12, the order of the blocks may be modified in other embodiments. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, ASIC, or FPGA, or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

It should be emphasized that the terms "comprises/comprising" when used in the this specification are taken to specify the presence of stated features, integers, steps, or components, but do not preclude the presence or addition of one or more other features, integers, steps, components, or groups thereof.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by a ZigBee coordinator of a network device and from a ZigBee sensor of another device, a watermark image associated with a vendor,
the vendor being associated with the other device;
authenticating, by the network device, the vendor of the other device by validating the watermark image associated with the vendor;
transmitting, by the network device and based on the authenticating the vendor of the other device by validating the watermark image associated with the vendor, first information, to the Zigbee sensor of the other device, indicating that the watermark image associated with the vendor is validated;
receiving, by the ZigBee coordinator of the network device and from the ZigBee sensor of the other device, a watermark image associated with a product related to the other device and provided by the vendor;
authenticating, by the network device, the other device by validating the watermark image associated with the product;
transmitting, by the network device and based on the authenticating the other device by validating the watermark image associated with the product, second information, to the Zigbee sensor of the other device, indicating that the watermark image associated with the product is validated; and
authorizing, by the network device, a service for the other device, over a ZigBee network when the watermark image associated with the vendor and the watermark image associated with the product have been successfully validated.

2. The method of claim 1, where authenticating the vendor includes:
validating the watermark image associated with the vendor using a Discrete Wavelet Transformation technique.

3. The method of claim 1, where authenticating the product includes:
validating the watermark image associated with the product using a Discrete Wavelet Transformation (DWT) technique.

4. The method of claim 1, where authorizing the service includes:
receiving, by the ZigBee coordinator and from the ZigBee sensor, a request for the service,
sending an authorization request to a user, associated with the other device, to authorize activating the service at the component,
receiving, based on sending the authorization request, an authorization response from the user, the authorization response indicating that the service is to be activated at the other device or indicating that the service is not to be activated at the other device, and
providing, by the ZigBee coordinator, service information to the other device when the authorization response indicates that the service is to be activated, the service information allowing the other device to activate the service.

5. The method of claim 4, where authorizing the service further includes:
providing, by the ZigBee coordinator and to the ZigBee sensor, an indication that the service has not been authorized for the other device when the authorization response indicates that the service is not to be activated.

6. The method of claim 1, further comprising:
providing, by the network device, information indicating that the other device has not been authenticated when at least one of the watermark image associated with the product or the watermark image associated with the vendor has not been successfully validated.

7. The method of claim 1, further comprising:
receiving, at the network device, an indication that a second service is to be revoked from a second device, the second device including a second ZigBee sensor;
setting the ZigBee coordinator to revoke the second service on the second device; and
providing, by the ZigBee coordinator, a request to revoke the second service to the second ZigBee sensor, the request to revoke the second service causing the second device to stop using the second service.

8. A network device comprising:
a memory to:
store first validation information for validating a vendor, the vendor being associated with a user device, and
store second validation information for validating the user device; and
a processor to:
receive a first watermark image, corresponding to the vendor, from a ZigBee sensor that is associated with the user device,
validate the vendor based on the first watermark image and using the first validation information,
transmit first information to the user device indicating that the vendor is validated;
receive a second watermark image, corresponding to the user device, from the ZigBee sensor,
validate the user device based on the second watermark image and using the second validation information,
transmit second information to the user device indicating that the user device is validated, and
permit a service to be provided to the user device when the vendor has been successfully validated and when the user device has been successfully validated.

9. The network device of claim 8, where
the first validation information and the second validation information include Discrete Wavelet Transformation (DWT) coefficients, and
when validating the vendor and the user device, the processer is further to:
perform a DWT technique, using the Discrete Wavelet Transformation (DWT) coefficients, to validate the vendor and the user device.

10. The network device of claim 8, where, when permitting the service to be provided to the user device, the processer is further to:
send an authorization request to authorize providing the service to the user device,
receive, based on sending the authorization request, an authorization response, the authorization response indicating that the service is to be provided to the user device or indicating that the service is not to be provided to the user device, and
send, to the ZigBee sensor, service information to the user device when the authorization response indicates that the service is to be provided, the service information allowing the user device to obtain the service.

11. The network device of claim 8, where the processer is further to:
receive an indication that a second service is to be revoked from a second user device, and
provide a request to revoke the second service to a second ZigBee sensor, associated with the second user device, the request to revoke the second service causing the second user device to stop using the second service.

12. The network device of claim 8, where the service includes a Wi-Fi service, and
where the processor is further to:
send, to the ZigBee sensor, Wi-Fi parameters that enable the user device to connect to a Wi-Fi network.

13. The network device of claim 8, where the memory is further to:
receive additional sets of first validation information and additional sets of second validation information, and
store the additional sets of first validation information and the additional sets of second validation information.

14. The network device of claim 13, where the additional sets of first validation information and the additional sets of second validation information are received by the memory from a remote device.

15. A non-transitory computer-readable medium for storing instructions, the instructions comprising:
one or more instructions, which, when executed by a processor of a wireless device, cause the processor to:
receive, from a user device, a first set of authentication information and a second set of authentication information,
the first set of authentication information associated with a vendor associated with the user device, and
the second set of authentication information associated with a product related to the user device and provided by the vendor;
authenticate the user device based on the first set of authentication information by validating a watermark image associated with the vendor;
transmit, based on the validating the watermark image associated with the vendor, first information, to the user device, indicating that the watermark image associated with the vendor is validated;
authenticate the user device based on the second set of authentication information by validating a watermark image associated with the product;
transmit, based on the validating the watermark image associated with the product, second information, to the user device, indicating that the watermark image associated with the product is validated; and
permit, based on authenticating the user device based on the first set of authentication information and the second set of authentication information, the user device to obtain a service.

16. The medium of claim 15, where
the one or more instructions to authenticate the user device based on the first set of authentication information further include:
one or more instructions to authenticate the vendor using a Discrete Waveform Transformation technique, and
the one or more instructions to authenticate the user device based on the second set of authentication information further include:
one or more instructions to authenticate the product using the Discrete Waveform Transformation technique.

17. The medium of claim 15, where the one or more instructions to permit the user device to obtain the service further include:
one or more instructions to send an authorization request to authorize the user device to obtain the service,
one or more instructions to receive, based on sending the authorization request, an authorization response, the authorization response indicating that the service is permitted to be obtained by the user device or indicating that the service is not permitted to be obtained by the user device, and
one or more instructions to provide, to the user device and over a ZigBee network, service information when the authorization response indicates that the service is permitted to be obtained by the user device, the service information permitting the user device to obtain the service.

18. The medium of claim 15, further comprising:
one or more instructions to provide information indicating that the user device has not been authenticated when at least one of the watermark image associated with the vendor or the watermark image associated with the product has not been successfully validated.

19. The medium of claim 15, further comprising:
one or more instructions to revoke a second service on a second user device by sending information to the second user device over a ZigBee network.

20. The medium of claim 15, where
the one or more instructions to authenticate the user device based on the first set of authentication information further include:
one or more instructions to authenticate the vendor using a geometric transformation technique, and
the one or more instructions to authenticate the user device based on the second set of authentication information further include:
one or more instructions to authenticate the product using the geometric transformation technique.

* * * * *